US008648730B2

(12) United States Patent
Rutter et al.

(10) Patent No.: US 8,648,730 B2
(45) Date of Patent: Feb. 11, 2014

(54) ALARM CONNECTABLE TO AN EXTERNAL AC POWER SUPPLY FOR STANDBY POWER AND COMPRISING BATTERY

(75) Inventors: Nicholas Rutter, Coventry (GB); Stuart Hart, Coventry (GB)

(73) Assignee: Sprue Safety Products Ltd (GB)

( * ) Notice: Subject to any disclaimer, the term of this patent is extended or adjusted under 35 U.S.C. 154(b) by 229 days.

(21) Appl. No.: 13/143,816

(22) PCT Filed: Jan. 11, 2010

(86) PCT No.: PCT/GB2010/000026
§ 371 (c)(1),
(2), (4) Date: Sep. 2, 2011

(87) PCT Pub. No.: WO2010/079336
PCT Pub. Date: Jul. 15, 2010

(65) Prior Publication Data
US 2011/0304469 A1   Dec. 15, 2011

(30) Foreign Application Priority Data
Jan. 10, 2009   (GB) ................... 0900382.3

(51) Int. Cl.
*G08B 17/10*   (2006.01)
(52) U.S. Cl.
USPC ............ 340/628; 340/539.1; 340/539.3; 340/630; 340/636.16; 324/429
(58) Field of Classification Search
USPC ............ 340/539.1, 539.3, 628, 630, 636.16; 324/429
See application file for complete search history.

(56) References Cited

U.S. PATENT DOCUMENTS

| | | | |
|---|---|---|---|
| 4,812,827 A | | 3/1989 | Scripps |
| 4,972,181 A | * | 11/1990 | Fiene ................... 340/636.16 |
| 5,257,007 A | * | 10/1993 | Steil et al. ............... 340/539.3 |
| 5,621,394 A | * | 4/1997 | Garrick et al. ............ 340/628 |
| 5,726,573 A | * | 3/1998 | Chen et al. .................. 324/429 |
| 6,362,743 B1 | * | 3/2002 | Tanguay et al. ............ 340/630 |
| 2010/0052894 A1 | * | 3/2010 | Steiner et al. ............ 340/539.1 |

FOREIGN PATENT DOCUMENTS

| | | |
|---|---|---|
| EP | 0610700 | 8/1994 |
| GB | 2356078 | 5/2001 |
| WO | WO 99/36891 | 7/1999 |

OTHER PUBLICATIONS

Search Report issued in application No. GB0900382.3 (2009).
International Search Report and Written Opinion issued in International Patent Application No. PCT/GB2010/000026 dated May 18, 2010.

\* cited by examiner

*Primary Examiner* — Daniel Wu
*Assistant Examiner* — Israel Daramola
(74) *Attorney, Agent, or Firm* — Barnes & Thornburg LLP

(57) ABSTRACT

An alarm for detecting radiation and/or pollutants such as smoke, carbon monoxide or the like, the alarm comprises: an alarm circuit (12) including detection means (14) for detecting the radiation and/or pollutants, and an audible alarm (16); a power supply circuit (24) connectable to an external AC power supply for supplying standby power to the alarm circuit (12); and a battery (20) for supplying power to the audible alarm (16) when the alarm is energized. The power supply circuit (20) is configured to supply current to the alarm circuit (12) at a level less than that required to energize the audible alarm (16).

10 Claims, 1 Drawing Sheet

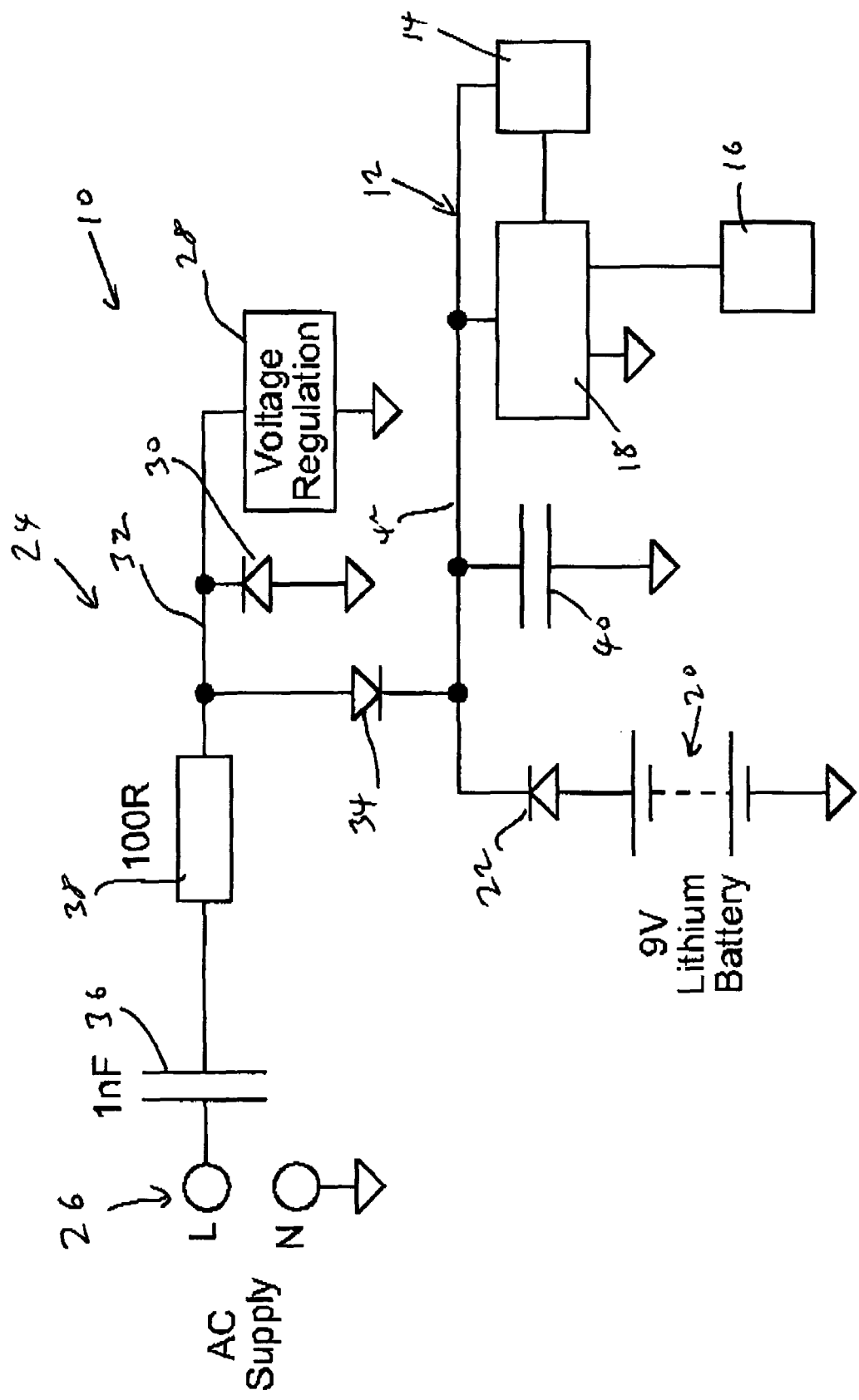

ALARM CONNECTABLE TO AN EXTERNAL AC POWER SUPPLY FOR STANDBY POWER AND COMPRISING BATTERY

CROSS REFERENCE TO RELATED APPLICATIONS

This patent application is a U.S. nationalization under 35 USC § 371 of International Application No. PCT/GB2010/1000026, filed Jan. 11, 2010, which claims priority to United Kingdom Patent Application No. GB0900382.3, filed Jan. 10, 2009. The disclosures set forth in the referenced applications are incorporated herein by reference in their entireties.

The present invention relates to an alarm and particularly, but not exclusively, to an alarm for detecting radiation and/or air pollutants such as smoke, carbon monoxide, radon and the like.

Currently, AC powered alarms are designed to run either on AC with a non-rechargeable, replaceable backup battery or on AC with a rechargeable backup battery.

A disadvantage of this type of design is that the power supply circuit of the alarm, which rectifies the high voltage AC to a low voltage DC, must be able to supply sufficient current to the alarm to energise the alarm when required (in the alarm condition). Where a rechargeable battery is provided, enough current must be supplied both to run the alarm in an alarm condition and to charge the battery. This leads to a very energy inefficient alarm since, for most of the time most of the power is simple wasted by the power supply circuit as heat.

The present invention seeks to provide an improved alarm.

Accordingly, the present invention provides an alarm for detecting radiation and/or pollutants such as smoke, carbon monoxide or the like, the alarm comprising: an alarm circuit including detection means for detecting said radiation and/or pollutants and an audible and/or visual alarm; a power supply circuit connectable to an external AC power supply for supplying standby power to said alarm circuit; and a battery for supplying power to said alarm when said alarm is energised; wherein said power supply circuit is configured to supply current to said alarm circuit at a level less than that required to energise said alarm.

In a preferred form of the invention the power supply circuit comprises means for reducing the current supplied to the alarm circuit to a level below that required to energise the alarm. Advantageously, this comprises a voltage divider.

Preferably the means comprises a capacitance in a power supply line of the power supply circuit, the capacitance having a value for example of 1 nF or less.

Where the alarm is a 9v alarm the capacitance typically has a value of 300 pF or less.

Preferably, the capacitance has a value of 270 pF.

In a preferred embodiment, the power supply circuit is configured to supply a current to the alarm circuit of no more than 50 µA, and preferably no more than 20 µA or 10 µA.

The present invention is further described, hereinafter, by way of example, with reference to the accompanying drawing which illustrates a preferred embodiment of the invention.

The drawing is a schematic diagrammatic representation of a preferred form of alarm 10. The alarm has an alarm circuit 12 which includes detection means 14 typically in the form of an ionisation chamber, an audible alarm 16 and main control circuitry 18. A piezo-electric buzzer may be provided as the audible alarm and power is supplied to the alarm from a battery 20, such as a lithium battery. A visual alarm may also be provided. These are contained in a main housing (not shown in the drawings).

The alarm is typically a smoke alarm although it will be appreciated that the invention is equally applicable to an alarm for detecting other air pollutants such as carbon monoxide, radon or the like.

The battery 20 has a forward biased diode 22 which serves as a blocking diode to prevent reverse current flowing into the battery.

The alarm also has a power supply circuit 24 which has suitable means in the form of terminals 26 for connection to an external AC power supply, a live rail 32 of the power supply circuit being connectable to the AC live. The power supply circuit 24 includes a voltage regulator 28 and diode 30 to provide half wave rectification of the AC input. Power from the live rail 32 of the power supply circuit is applied to the alarm circuit 12 by way of a further diode 34 which serves to prevent reverse current flowing from the battery into the power supply circuit. A smoothing capacitor 40 is provided on the supply line 42 to the alarm circuit 12.

The power supply circuit 24 also has a series capacitance 36 and resistance 38 in the power rail 32 which, together with the remaining circuit, act as a potential divider to provide a voltage drop across the capacitance 36 and resistance 38 and provide a set voltage for the alarm circuit. The resistance 38 also limits current surges which may be caused by transients in the AC power supply.

The capacitance 36 is set at a value which reduces the current supplied to the alarm circuit 12 to a level which is too low to energise the audible alarm 16 in an alarm state but is at a level to provide standby power to the main control circuitry 18 and the ionisation chamber 14. A typical value for capacitance 36 is about 270 pF or 1 nF and can be in the range 47 nF to 100 pF.

When the audible alarm 16 is triggered, the battery 20 provides sufficient power to energise the alarm.

The battery is typically a high capacity, non-rechargeable, sealed battery which may be capable of supplying the necessary power for the audible alarm 16 for its entire life, which could be as long as 10 years.

In an alarm condition power is drawn mainly from the high capacity battery 20 and not the AC supply. The fact that the power supply circuit is not required to energise the audible alarm 16 results in a significantly reduced power consumption, and thus a far more energy efficient and lower cost alarm.

In addition, since the battery is not required to provide continuous power to the alarm circuit 12 for its entire life, the power supply circuit providing standby power, the sealed battery may have a lower capacity (with environmental and cost benefits) than would be required for a solely battery-powered alarm with a similar design life.

Many circuits used in conventional alarms monitor the voltage across the power supply while applying a significant current load in order to determine battery condition. If an ac derived supply is used that is capable of providing significant current (as used by currently available ac alarms), the monitored voltage may be determined by the ac derived supply condition rather than the battery, resulting in a false indication of battery condition. The present invention requires an ac derived current that is typically much lower than the applied current load, so the true battery condition can be monitored directly from the circuits' supply without being significantly affected by the presence of the ac supply.

The power saving is best illustrated by the following example.

EXAMPLE

In a conventional 3v smoke alarm where power for the alarm circuitry including the audible alarm is provided by AC power through a power supply circuit, a typical current for driving the audible alarm would be 70 mA and a current of 10 μA for standby operation. These figures are approximate but are the right order of magnitude. A capacitance/resistance voltage divider in the power supply circuit is used to provide the current for the alarm with much lower power dissipation.

If we assume that the supply is half wave rectified then an RMS current of 155 mA is required. A series resistor is provided in series to limit surge current, with a typical value of 100Ω. For the calculated current this will dissipate 2.4 W of energy. An additional 0.23 W is typically dissipated by voltage regulation circuit components such as zener diodes. Over a year this corresponds to 23.1 kWh of energy, costing around £4 Sterling at current costs. There will also be losses in the power supply cables.

In the preferred alarm described with reference to the drawing, where the mains supply only provides standby power for the alarm, an RMS current of 22 μA is required. A different capacitor value would be used to achieve this. Assuming the same resistor value is used, the power dissipated is 48 nW. An additional 30 μW is dissipated by voltage regulation circuit components. Over a year this corresponds to $0.26*10^{-3}$ kWh costing around 0.5 p Sterling at current costs.

The value of capacitance 36 and resistance 38 are chosen such that the instantaneous rectified voltage provided by the AC supply to the alarm circuit 12 is always higher than the voltage that would otherwise be provided by the battery (while providing standby current). This ensures that the diode 22 is always reverse biased, preventing current being drawn from the battery during standby. When the audible alarm 16 is energized, the alarm circuit 12 draws an increased current and the voltage applied to the alarm circuit 12 drops. The effect is that the diode 22 becomes forward biased and the required current for the audible alarm 16 is supplied by the battery 20.

The smoothing capacitance 40 should be large enough to ensure that the rectified voltage never drops below the battery voltage on standby. Based on a 10 μA load and a 50 Hz AC supply, a typical capacitance value of 0.47 μF will prevent the voltage applied to the alarm circuit 12 dropping by more than around 0.2V.

Because of the significant difference in current drains between conventional circuits and the present invention, a huge energy saving can be made. Smaller, cheaper, lower power electronic components can be used in the alarm power supply circuit which can operate at lower and consequently safer temperatures. A very simple circuit can be used with none of the additional cost or complication of battery charging circuits. In addition, the alarm dispenses with the additional mechanical requirements, such as casing and clips, which are needed to support a replaceable battery. Finally, the use of a high capacity sealed for life battery removes the requirement for the user periodically to change the battery, a task which is frequently overlooked with potentially disastrous results in an emergency situation should the AC power fail.

The alarm 10 may also be provided with a disconnect means (not shown) in series with the battery 20 which disconnects the battery from the alarm circuit 12, for example during shipping of the alarm. The disconnect means may be in the form of an electrical switch in series with the battery. The switch is closed to connect the battery and activate the alarm.

The switch can be a conventional self contained device or an equivalent, such as an insulating tab between two electrical contacts in the battery line that is pulled out to close the circuit.

Another form of disconnect means is an electronic switch which is activated by opening an electrical circuit. This is typically a shorting link that is pulled out to activate the alarm. This method has the advantage of being failsafe, i.e. opening the circuit (which is the most likely failure mechanism) will activate the alarm.

A further form of disconnect means is an electrical switch connected to an input of a microcontroller in the alarm. Operation of the switch causes the microcontroller to change its operating mode between 'sleep' (very little power taken from the battery) and active. The battery is not electrically isolated using this method but the consequences are similar. As with the previous method, the switch can be configured to be failsafe (open circuit to activate the alarm).

In each of the above cases the disconnect means can be operated directly (by pulling out a tab or operating a switch) or indirectly (the alarm is activated automatically when fitted to its mounting plate).

The invention claimed is:

1. An alarm for detecting radiation and/or pollutants, the alarm comprising:
    an alarm circuit including detection means for detecting said radiation and/or pollutants, and an audible alarm;
    a power supply circuit connectable to an external AC power supply for supplying standby power to said alarm circuit; and
    a battery for supplying power to said audible alarm when said alarm is energised;
    wherein said power supply circuit is configured to supply current to said alarm circuit at a level less than that required to energise said audible alarm.

2. An alarm as claimed in claim 1 wherein said power supply circuit comprises means for reducing the current supplied to said alarm circuit to a level below that required to energise said audible alarm.

3. An alarm as claimed in claim 2 wherein said means comprises a voltage divider.

4. An alarm as claimed in claim 2 wherein said means comprises a capacitance in a power supply line of said power supply circuit.

5. An alarm as claimed in claim 4 wherein said capacitance has a value of 1 nF or less.

6. An alarm as claimed in claim 4 wherein said alarm is a 9v alarm and said capacitance has a value of 300 pF or less.

7. An alarm as claimed in claim 6 wherein said capacitance has a value of 270 pF.

8. An alarm as claimed in claim 1 wherein said power supply circuit is configured to supply a current to said alarm circuit of no more than 50 μA.

9. An alarm as claimed in claim 1 wherein said power supply circuit is configured to supply a current to said alarm circuit of no more than 20 μA.

10. An alarm as claimed in claim 1 wherein said power supply circuit is configured to supply a current to said alarm circuit of no more than 10 μA.

* * * * *

UNITED STATES PATENT AND TRADEMARK OFFICE
CERTIFICATE OF CORRECTION

PATENT NO.       : 8,648,730 B2                                           Page 1 of 1
APPLICATION NO.  : 13/143816
DATED            : February 11, 2014
INVENTOR(S)      : Rutter et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 281 days.

Signed and Sealed this
Twenty-ninth Day of September, 2015

Michelle K. Lee
*Director of the United States Patent and Trademark Office*